May 18, 1954 N. H. ROY 2,678,796
VIBRATION AND SHOCK ISOLATOR
Filed April 30, 1952 2 Sheets-Sheet 1
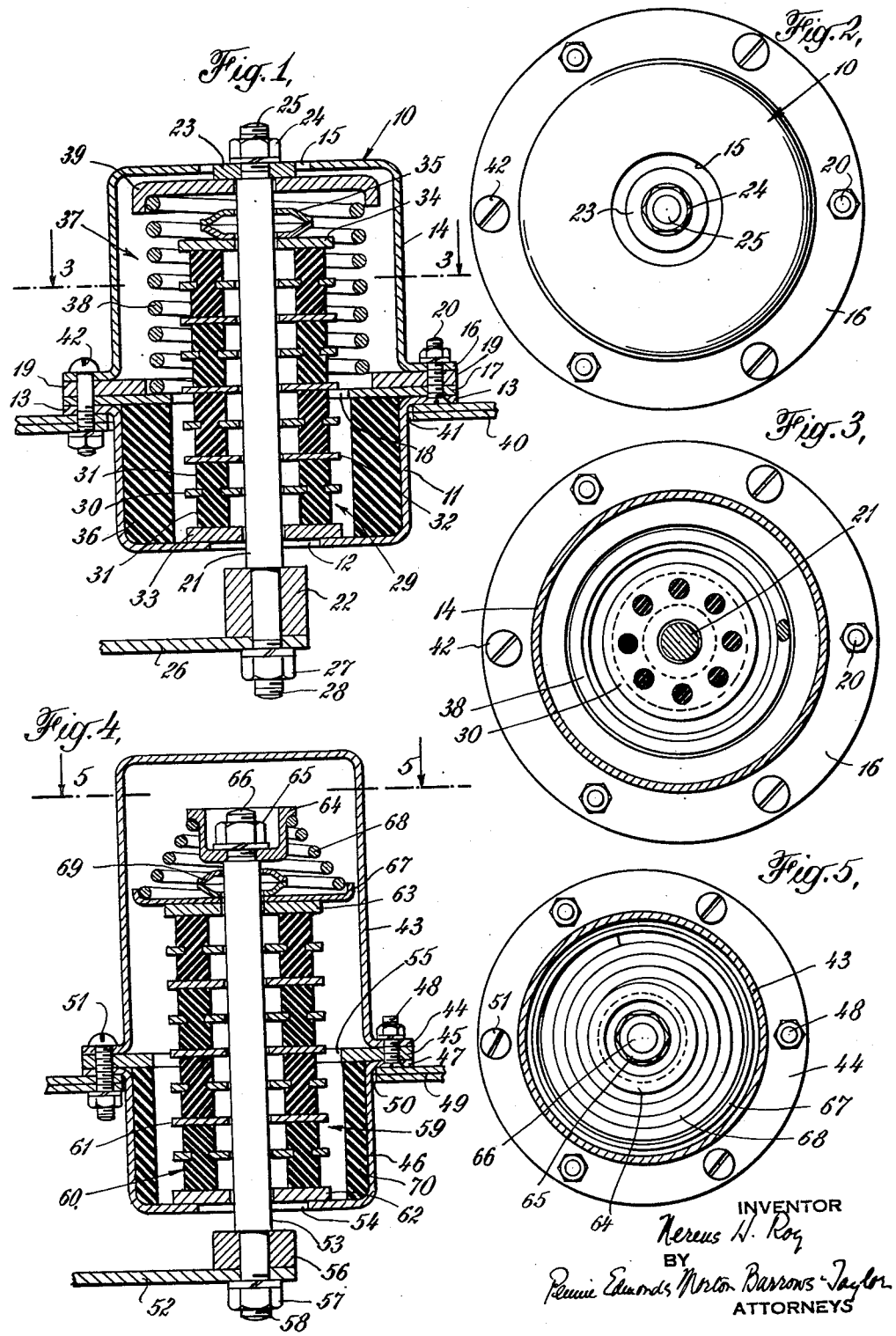

May 18, 1954   N. H. ROY   2,678,796
VIBRATION AND SHOCK ISOLATOR
Filed April 30, 1952   2 Sheets-Sheet 2
Fig. 6,
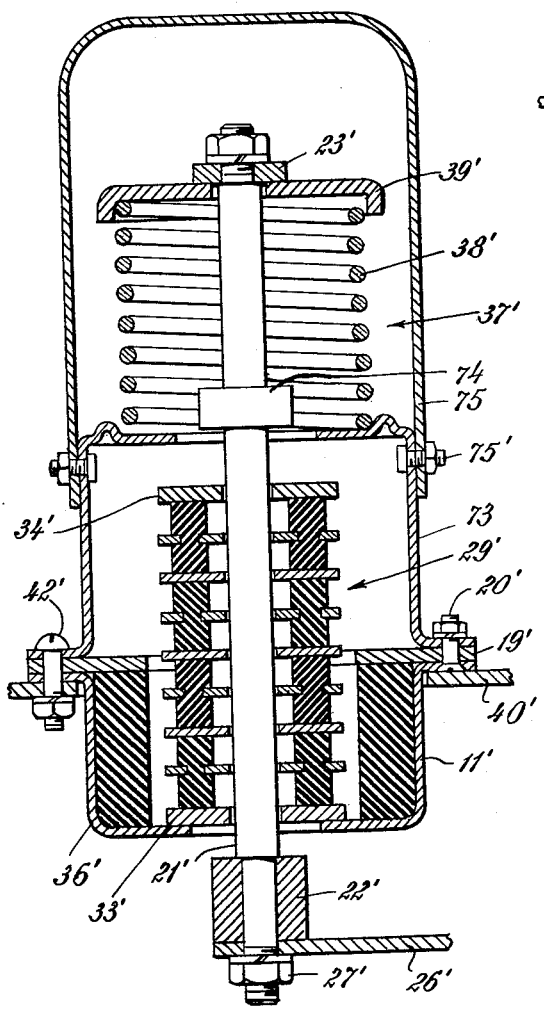
Fig. 7,
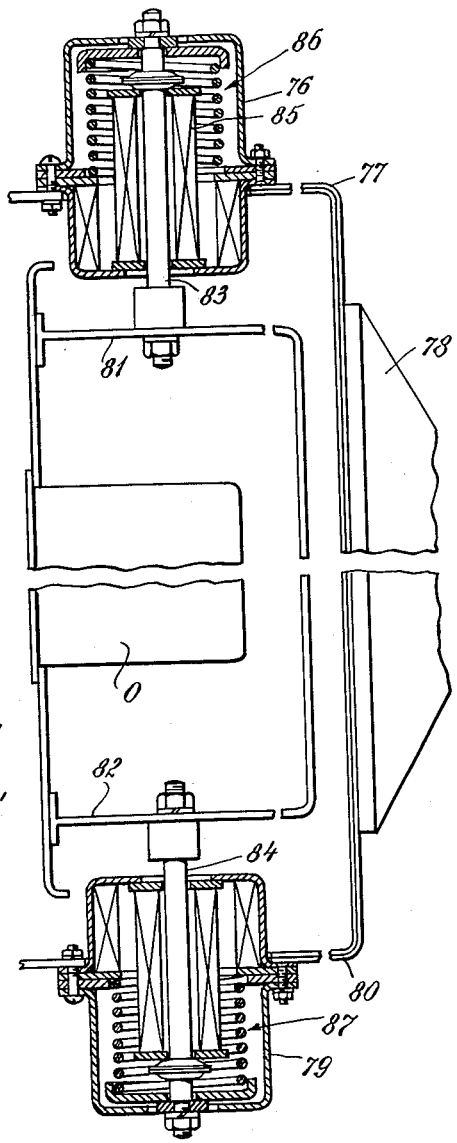
INVENTOR
Nereus H. Roy
BY
Pennie Edmonds Morton Barrows Taylor
ATTORNEYS Patented May 18, 1954

2,678,796

UNITED STATES PATENT OFFICE 2,678,796

VIBRATION AND SHOCK ISOLATOR

Nereus H. Roy, Glenbrook, Conn., assignor to Waugh Equipment Company, New York, N. Y., a corporation of Maine Application April 30, 1952, Serial No. 285,113

5 Claims. (Cl. 248—358)

This invention relates to yielding mounts to be interposed between an object and a fixed support, such a mount carrying the weight of the object and isolating vibration and absorbing shock. More particularly, the invention is concerned with a novel mount especially suitable for supporting objects, which require unusually good protection against low amplitude vibration in one direction and heavy shocks in all directions, such objects frequently being of relatively light weight. The new mount may be advantageously employed in marine installations for supporting such objects as switchboards, instrument panels, etc., and forms of the new mount suitable for such application will, accordingly, be illustrated and described in detail for purposes of explanation.

On shipboard and especially on naval vessels, it is important that switchboard and similar structures be supported on mountings which are capable of isolating the structures from the vibration of the engines and such mountings should also be capable of protecting the structures against high intensity shocks resulting from explosions, direct hits, and near misses. In addition, the mounting should be of such construction that those parts of the mounting, which isolate vibration, are fully protected against damage by shock.

The present invention is directed to the provision of a mounting meeting the requirements stated and the new mount is of simple construction, is easily installed, and functions for indefinite periods without requiring attention or adjustment. The new mount comprises a casing adapted to be secured rigidly to the support and a member extending longitudinally of the casing and projecting out of the casing through one end, the projecting end of the member being adapted to be secured rigidly to the object. The member is movable both endwise and laterally and endwise vibrational movement of the member is resisted by vibration-isolating means engaging an abutment on the member and supported by a part of the casing. A shock-absorbing unit encircles the member within the casing and acts through an abutment on the member, after an initial travel of the member against the resistance of the vibration-isolating means, to resist further movement of the member in that direction. The shock-absorbing unit is seated on the end of the casing, through which the member projects, and, when it is functioning, the vibration-isolating means is inoperative and no forces are transmitted through it. A second shock-absorbing unit within the casing resists lateral movement of the member and both units preferably include rubber springs, while the resilient element of the vibration-isolating means is preferably a metallic spring.

The new mount is similar to that shown in my copending application, Ser. No. 262,306 filed December 18, 1951, but differs therefrom in respects which will be pointed out later.

For a better understanding of the invention, reference may be made to the accompanying drawings, in which:

Fig. 1 is a vertical sectional view of one form of the new mount;

Fig. 2 is a top plan view of the mount of Fig. 1;

Fig. 3 is a sectional view on the line 3—3 of Fig. 1;

Fig. 4 is a vertical sectional view of a second form of the new mount;

Fig. 5 is a sectional view on the line 5—5 of Fig. 4;

Fig. 6 is a vertical sectional view of a third form of the new mount; and

Fig. 7 is a view, partly in vertical section and partly in elevation, of an installation, in which two of the mounts of the form shown in Fig. 1 are used to support an object.

The new mount in the form shown in Figs. 1-3, inclusive, comprises a casing 10, which includes a lower cup 11 having a flat bottom with a central opening 12 and a peripheral flange 13 extending laterally at its upper end. The housing also includes an upper casing 14 similar to cup 11, but somewhat longer and having a flat upper end with a central opening 15 and a peripheral flange 16 extending laterally at its lower end. The cups are of the same diameter, and they are assembled with their concavities facing each other and their flanges in alignment. A flat ring 17 is disposed between the flanges 13, 16 of the cups, and its central opening 18 is in alignment with the openings 12, 15 in the cups. Ring 17 is of the same outer diameter as the flanges, and a flat ring 19 of the same outer diameter as ring 17 is mounted on top of ring 17 and between it and flange 16. The inner diameter of ring 19 is substantially greater than that of the aligned openings through the cups and ring 17. The assembly of the cups and rings is secured together by bolts 20 extending through aligned openings in the flanges of the cups and in the rings.

A rod 21 extends through the openings 12, 15 in the cups, the central opening 18 in ring 17, and the ring 19, and the lower end of the rod below the bottom of cup 11 is shouldered and encircled by a collar 22 engaging the shoulder and of less diameter than opening 12. At its upper end, the rod is also shouldered and encircled by a washer 23 of less diameter than opening 15 and held against the shoulder by a nut 24 threaded on the end 25 of the rod. The lower end of the rod is to be connected to the object to be supported, and the connection is made by an arm 26 having an opening through which the rod extends, the arm being held against collar 22 by a nut 27 threaded on the lower end 28 of the rod.

The lower cup 11 supports a shock-absorbing unit 29, which encircles rod 21 and is made up of a plurality of rubber springs each consisting of a flat metal ring 30 having rubber rings 31 applied to opposite faces thereof and connected together through openings in the metal ring. Adjacent rubber springs are separated by a flat metal divider ring 32. The shock-absorbing unit shown is made up of four rubber springs and the unit extends through the openings in rings 17 and 19. The lower end of the unit engages the upper surface of a flat follower ring 33, which encircles rod 21 and rests on the inner side of the lower end of cup 11. The follower is engageable by collar 22 on the rod, when the rod moves upwardly a sufficient distance.

A flat follower ring 34 rests upon the top rubber spring of unit 29 and a pair of dished metallic disks 35, mounted with their concavities opposed and of the type known as Belleville springs, encircle the rod and rest on top of follower 34.

The lower cup contains a second shock-absorbing unit 36, which has the form of a rubber sleeve lying within the cup against the inner cylindrical surface thereof and extending from the bottom of the cup to engage the lower surface of disk 17. The sleeve has an inner diameter somewhat greater than the outer diameter of follower 33, but is engageable with the follower, when the latter is moved laterally with rod 21.

The upper cup 14 contains vibration-isolating means 37 including a coil spring 38, which encircles rod 21 and the upper end of the shock-absorbing unit 29 and is seated at its lower end on top of ring 17 within ring 19, the latter ring serving to center the lower end of the spring. The spring extends upwardly above the top of the spring disks 35 and, at its upper end, supports a flanged follower disk 39, which is held by the spring in contact with the inner surface of washer 23.

In use, the mount is attached to a rigid support 40 by having its lower cup inserted through an opening 41 through the support, and the mount is then secured to the support by bolts 42, which pass through aligned openings in the support, the cup flanges 13, 16 and the rings 17 and 19. The object is then connected by arm 26 to rod 21, and the weight of the object is thus normally taken by spring 38 of the vibration-isolating means. The collar 22 forms a lower abutment on rod 21 and the washer 23, nut 24, and follower disk 39 form an upper abutment on the rod.

In the normal operation of the mount, vibration of the support is isolated by the alternate compression and expansion of the coil spring 38, and the mount is so constructed that the travel of follower 39 between its normal position shown and the position in which it engages the top of the upper spring disk 35, is greater than the amplitude of the vibration, to which the object is normally subjected. In the event that the support is subjected to a heavy shock, which causes the member 21 to move down against the resistance of spring 38, follower 39 first engages and flattens spring disks 35, and thereafter the shock-absorbing unit 29 resists further downward movement of the rod and follower 39. The flattening of disks 35 occurs before the coil spring 38 has gone solid, so that, when shock-absorbing unit 29 is functioning, the vibration-isolating means is out of action. If the shock is in the direction with the support moving downwardly, abutment 22 on the rod engages the lower follower 33, and the shock-absorbing unit 29 moves upwardly until, in an extreme case, the upper spring disk 35 engages the upper follower 39. The follower 39 then moves up into contact with the top of cup 14, and, thereafter, the shock is absorbed first by spring disks 35 and later by unit 29.

The modified form of the new mount shown in Figs. 4 and 5 comprises an upper cup 43 having peripheral flanges 44 resting upon a flat ring 45. The mount also includes a lower cup 46 having a flange 47 engaging the lower surface of ring 45, and the cups and ring are secured together by bolts 48 passing through openings in the flanges and ring. In securing the mount to support 49, an opening 50 is formed in the support, the lower cup is passed through the opening, and the mount is then attached to the support by bolts 51 passing through aligned openings in the support and the flanges and ring. The object to be supported is connected by an arm 52 to a rod 53, which passes through aligned openings 54 and 55 in the lower end of cup 46 and ring 45, respectively. The lower end of the rod is of reduced diameter to form a shoulder engaged by a collar 56 serving as a lower abutment and the rod extends through the collar and then through an opening in arm 52, and is held in place by a nut 57 threaded on the lower end 58 of the rod. A shock-absorbing unit 59, made up of rubber springs 60, separated by divider plates 61, rests on a lower follower 62 which encircles rod 53 and is seated on the lower end of cup 46. The shock-absorbing unit extends upwardly through ring 45 and into the upper cup 43. At its upper end, the unit carries an upper follower 63.

At its upper end, the rod 53 carries a cup-shaped follower 64, which is held against the shoulder on the rod by a nut 65 threaded on the upper end 66 of the rod. A flanged follower 67 encircles the rod and rests on the top of follower 63. A coil spring 68 bears against followers 64 and 67 and, with them, forms a vibration-isolating unit. Dished spring washers 69 may be mounted on rod 53 between followers 64 and 67, if desired. Followers 64 and 67 and the spring washers 69, when used, act as an upper abutment on rod 53.

The mount includes a unit 70 for absorbing horizontal components of shock, the unit consisting of a rubber sleeve mounted within cup 46 and extending from the lower end thereof to the under surface of ring 45. In the construction shown in Figs. 4 and 5, the vibration-isolating means is supported by the shock-absorbing unit, which is, in turn, supported by the lower end of cup 46. The shock-absorbing unit is much stiffer than the metal spring 68 of the vibration-isolating means, so that vibration is isolated substantially entirely by spring 68.

The device shown in Figs. 4 and 5 functions in the same manner as that shown in Figs. 1-3, inclusive, with vibration isolated by the isolating means including spring 68, and shock absorbed by units 59 and 60. However, the shock-absorbing unit 60 of the device of Figs. 4 and 5 acts to absorb shocks in one direction only, namely, shocks tending to move the unit upwardly relative to rod 53.

The form of the new mount shown in Fig. 6 is similar to that shown in Fig. 1, except that the vibration-isolating means 37' includes a coil spring 38' encircling rod 21' and bearing at its lower end on the outer surface of the upper end of upper cup 73. Rod 21' carries a collar 23' bearing against a flanged follower disk 39' which rests on top of spring 38', the collar 23' and the disk 39' forming an upper abutment on rod 21'. The rod carries an intermediate abutment 74, which is movable through an opening in the top of cup 73. The vibration-isolating unit is enclosed within a cup 75, which telescopes over the upper end of cup 73 and is secured thereto by bolts 75'. The lower cup 11' has a flange secured to the flange of upper cup 73 and a flat ring 19' interposed between the flanges. The flanges and ring are secured together by bolts 20', and the mount is secured in an opening in support 49' by bolts 42' passing through the support and the flanges and ring. The lower cup 11' contains a shock-absorbing unit 36' in the form of a sleeve of rubber, and a shock-absorbing unit 29' made up of rubber springs and divider plates encircles rod 21' within cups 11' and 73. The shock-absorbing unit 29' rests upon a lower follower 33' seated on the lower end of cup 11'. The unit carries a follower 34' at its upper end, which is of greater diameter than the opening through the top of cup 73. The rod 21' is provided with a collar 22' serving as a lower abutment at its lower end beyond the bottom of cup 11', and one end of an arm 26' is mounted in the lower end of the rod and held in place by a nut 27'. The other end of arm 26' is to be connected to the object.

The mount shown in Fig. 6 functions as follows: Vibration is isolated by the isolating means including spring 37'. If the mount is subjected to a shock tending to move the support upward relative to rod 21', the follower 34' will engage the abutment 74 on the rod, and the shock will be absorbed by unit 29'. If the shock occurs in the reverse direction, follower 33' will engage collar 22' on the rod, and when follower 34' is engaged by the top of cup 73, unit 29' acts to absorb the shock. Any horizontal component of the shock will be absorbed by unit 36' engaging follower 33'.

A typical installation employing two of the mounts of the construction shown in Fig. 1 is illustrated in Fig. 7, in which the upper mount 76 is attached to the upper part of framework member 77 secured to the fixed support 78, and the lower mount 79 is reversed in position and secured to the lower part 80 of the framework. The object O is secured to a frame having bars 81 and 82 connected to the rods 83 and 84 of the upper and lower mounts, respectively. In the mounts, the shock-absorbing units have been indicated by oblong figures containing crossed diagonals, one such figure being designated 85. In the installation shown in Fig. 7, vibration in opposite directions is isolated by the vibration-isolating means 86, 87 in the upper and lower mounts, respectively, while shocks in either vertical direction as well as horizontal components of shock are absorbed by shock-absorbing units in the respective mounts. Mount 76 functions in the manner described in connection with the mount described in Fig. 1, while mount 79, which is upside down, functions in the reverse manner.

The mounts of the invention are frequently used in oppositely disposed pairs, as shown in Fig. 7, and, with such an arrangement, the shock absorbing unit of each mount, which is made up of a plurality of rubber springs, acts to absorb shocks in one direction only. The unit may, accordingly, be seated at one end on the casing and extend lengthwise of the casing for the greater part of the length thereof, so that the unit has large capacity. Thus, in the mount shown in Fig. 1, the unit 29 is seated on the lower end of the casing and extends up through the central opening 18 in the flat ring 17 and past the midpoint of the upper part of the casing. When the amount is used with a similar mount as a pair, the unit 29 in each mount absorbs shocks tending to move the mount toward the follower 39 in the mount.

The mounts shown in my copending application may be provided with a pair of shock absorbing units made up of rubber springs and bearing against opposite faces of a central partition between the two parts of the casing. One unit of the pair in each mount absorbs shocks in one direction and the other absorbs shock in the other direction. Each unit has much less capacity than the single unit employed in the mounts of the present application. The prior mounts are, accordingly, for lighter duty than those of the present application.

I claim:

1. A mount for isolating vibration and absorbing shock between an object and a support, which comprises a casing having an internal circumferential shoulder between its ends, means for rigidly attaching the casing to the support, a member extending longitudinally of the casing and projecting through one end of the casing, the member being movable endwise and laterally, means for securing the exposed portion of the member rigidly to the object, an abutment on the member within the casing, vibration-isolating means encircling the member within the casing and acting through the abutment to resist endwise movement of the member out through said end of the casing, a shock-absorbing unit encircling the member within the casing and normally having one end seated on said end of the casing, the unit extending through the shoulder and having its other end opposed to and normally spaced from the abutment, the unit being laterally movable with the member, and a second shock-absorbing unit within the casing surrounding the first unit and the member and resisting lateral movement of the first unit and the member.

2. A mount for isolating vibration and absorbing shock between an object and a support, which comprises a casing having an internal circumferential shoulder between its ends, means for rigidly attaching the casing to the support, a member extending longitudinally of the casing and projecting through one end of the casing, the member being movable endwise and laterally, means for securing the exposed portion of the member rigidly to the object, an abutment on the member within the casing, vibration-isolating means encircling the member within the casing and seated on said shoulder, said means acting through the abutment to resist endwise movement of the member out through said end of the casing, a shock-absorbing unit encircling the member within the casing and normally having one end seated on said end of the casing, the unit extending through the shoulder and having its other end opposed to and normally spaced from the abutment, the unit being laterally movable with the member, and a second shock-absorbing unit within the casing surrounding the first unit and the member and resisting lateral movement of the first unit and the member.

3. A mount for isolating vibration and absorbing shock between an object and a support, which comprises a casing having an internal circumferential shoulder between its ends, means for rigidly attaching the casing to the support, a member extending longitudinally of the casing and projecting through one end of the casing, the member being movable endwise and laterally, means for securing the exposed portion of the member rigidly to the object, an abutment on the member within the casing, a coil spring encircling the member within the casing and having its ends engaging the abutment and seated on the shoulder, respectively, the spring acting through the abutment to resist endwise movement of the member out through said end of the casing, a shock-absorbing unit encircling the member within the casing and normally having one end seated on said end of the casing, the unit extending through the shoulder and having its other end opposed to and normally spaced from the abutment, the unit being laterally movable with the member, and a second shock-absorbing unit within the casing surrounding the first unit and the member and resisting lateral movement of the first unit and the member.

4. A mount for isolating vibration and absorbing shock between an object and a support, which comprises a casing having an internal circumferential shoulder between its ends, means for rigidly attaching the casing to the support, a member extending longitudinally of the casing and projecting through one end of the casing, the member being movable endwise and laterally, means for securing the exposed portion of the member rigidly to the object, an abutment on the member within the casing, vibration-isolating means encircling the member within the casing and acting through the abutment to resist endwise movement of the member out through said end of the casing, a shock-absorbing unit including a group of rubber springs encircling the member within the casing with one end of the group normally seated on said end of the casing and the other end of the group opposed to and normally spaced from the abutment, the unit extending through the shoulder and being laterally movable with the member, and a second shock-absorbing unit within the casing surrounding the first unit and the member and resisting lateral movement of the first unit and the member.

5. A mount for isolating vibration and absorbing shock between an object and a support, which comprises a casing, means for rigidly attaching the casing to a support, a member extending longitudinally of the casing and projecting through one end of the casing, the member being movable endwise and laterally, means for securing the exposed portion of the member rigidly to the object, an abutment on the member within the casing, vibration-isolating means encircling the member within the casing and acting through the abutment to resist endwise movement of the member out through said end of the casing, a shock-absorbing unit encircling the member within the casing and normally having one end seated on said end of the casing and its other end opposed to and spaced from the abutment, the unit being laterally movable with the member and enclosing the greater portion of the length of the member between the abutment and said end of the casing, and a second shock-absorbing unit within the casing surrounding the first unit and the member and resisting lateral movement of the first unit and member.

References Cited in the file of this patent

UNITED STATES PATENTS

| Number | Name | Date |
|---|---|---|
| 2,010,623 | Bugatti | Aug. 6, 1935 |
| 2,356,962 | Williams | Aug. 29, 1944 |
| 2,402,400 | Hewitt et al. | June 18, 1946 |
| 2,520,442 | Schwartz | Aug. 29, 1950 |